United States Patent [19]
Johnson et al.

[11] Patent Number: 5,925,108
[45] Date of Patent: Jul. 20, 1999

[54] EVENT NOTIFICATION IN A COMPUTER SYSTEM

[75] Inventors: Monte L. Johnson, Orem; Lori Olson Gauthier; Troy Thomas, both of Spanish Fork; Mark Dakins, Springville, all of Utah

[73] Assignee: Novell, Inc., Provo, Utah

[21] Appl. No.: 08/741,925

[22] Filed: Oct. 31, 1996

Related U.S. Application Data

[60] Provisional application No. 60/007,214, Nov. 3, 1995.

[51] Int. Cl.$^6$ ................................................. G06F 15/163
[52] U.S. Cl. ................................................. 709/300; 709/1
[58] Field of Search ................................. 395/670, 672, 395/673, 704, 680, 682

[56] References Cited

U.S. PATENT DOCUMENTS

| | | | |
|---|---|---|---|
| 5,185,885 | 2/1993 | Dysart et al. | 395/600 |
| 5,212,778 | 5/1993 | Dally et al. | 395/400 |
| 5,237,684 | 8/1993 | Record et al. | 395/650 |
| 5,247,676 | 9/1993 | Ozur et al. | 395/650 |
| 5,265,206 | 11/1993 | Shackelford et al. | 395/200 |
| 5,276,899 | 1/1994 | Neches | 395/800 |
| 5,283,856 | 2/1994 | Gross et al. | 395/51 |
| 5,291,593 | 3/1994 | Abraham et al. | 395/600 |
| 5,291,608 | 3/1994 | Flurry | 395/725 |
| 5,305,454 | 4/1994 | Record et al. | 395/650 |
| 5,305,461 | 4/1994 | Feigenbaum et al. | 395/775 |
| 5,315,703 | 5/1994 | Matheny et al. | 395/164 |
| 5,321,837 | 6/1994 | Daniel et al. | 395/650 |
| 5,321,841 | 6/1994 | East et al. | 395/725 |
| 5,339,423 | 8/1994 | Beitel et al. | 395/600 |
| 5,355,406 | 10/1994 | Checinski et al. | 379/88 |
| 5,355,484 | 10/1994 | Record et al. | 395/650 |
| 5,367,633 | 11/1994 | Matheny et al. | 395/164 |
| 5,377,350 | 12/1994 | Skinner | 395/600 |
| 5,388,189 | 2/1995 | Kung | 395/50 |
| 5,394,544 | 2/1995 | Motoyama et al. | 395/575 |
| 5,396,630 | 3/1995 | Banda et al. | 395/700 |
| 5,404,529 | 4/1995 | Chernikoff et al. | 395/700 |
| 5,414,851 | 5/1995 | Brice, Jr. et al. | 395/650 |
| 5,414,854 | 5/1995 | Heninger et al. | 395/700 |
| 5,418,968 | 5/1995 | Gobeli | 395/725 |
| 5,421,014 | 5/1995 | Bucher | 395/650 |
| 5,421,016 | 5/1995 | Conner et al. | 395/700 |
| 5,423,023 | 6/1995 | Batch et al. | 395/500 |
| 5,423,043 | 6/1995 | Fitzpatrick et al. | 395/700 |
| 5,428,734 | 6/1995 | Haynes et al. | 395/159 |
| 5,428,792 | 6/1995 | Conner et al. | 395/700 |
| 5,430,875 | 7/1995 | Ma | 395/650 |
| 5,430,876 | 7/1995 | Schreiber et al. | 395/650 |
| 5,434,964 | 7/1995 | Moss et al. | 395/157 |
| 5,437,007 | 7/1995 | Bailey et al. | 395/159 |
| 5,437,014 | 7/1995 | Busboom et al. | 395/275 |
| 5,437,025 | 7/1995 | Bale et al. | 395/600 |
| 5,781,724 | 7/1998 | Nevarez et al. | 395/186 |

OTHER PUBLICATIONS

"The Amadeus GRT", V. Cahill et al., *OOPSLA*, 1993, pp. 144–161.

"ASX: An Object–Oriented Framework for Developing Distributed Applications", D. Schmidt, *USENIX Association C++ Technical Conference*, 1994, pp. 207–226.

"Callback functions: The heart of every GUI's API", R. van Loon, *C++ Report*, Nov.–Dec. 1994, pp. 43–46.

(List continued on next page.)

*Primary Examiner*—Majid A. Banankhah
*Attorney, Agent, or Firm*—Computer Law+

[57] ABSTRACT

A system and method separate the order in which event handlers register from the order in which the event handlers are notified of events. This allows any convenient registration order to be used together with a notification order that corresponds to a network architecture, a memory hierarchy, or another familiar scale. The notification order is determined by the event producers, and therefore may be reversed without re-registering the event handlers. Events may be broadcast, may carry data between event handlers, and may be consumed to prevent further notifications.

20 Claims, 5 Drawing Sheets

OTHER PUBLICATIONS

"A Communication Facility for Distributed Object–Oriented Applications", S. Deshpande et al., *USENIX Association C++ Technical Conference,* 1992, pp. 263–276.

"Communication Mechanism on Autonomous Objects", Y. Ishikawa, *OOPSLA,* 1992, pp. 303–314.

"Designing Object Systems—Object communication", S. Cook et al., *JOOP,* Sep. 1994, pp. 14–23.

"An expanded view of messages", D. Firesmith, *JOOP,* Jul.–Aug. 1993, pp. 51–52.

"Event–Driven Threads C++", D. Ford, *Dr. Dobb's Journal,* Jun. 1995, pp. 48–50, 52, 53, 98, 100, 102.

"The Kala Basket", S. Simmel et al., *OOPSLA,* 1991, pp. 230–246.

"Object–oriented design of a finite state machine", M. Ackroyd, *JOOP,* Jun. 1995, pp. 50–59.

"Optimizing Multi–Method Dispatch Using Compressed Dispatch Tables", E. Amiel et al., *OOPSLA,* 1994, pp. 244–258.

"OTSO—An Object Oriented Approach To Distributed Computation", J. Koivisto et al., *USENIX Association C++ Conference,* 1991, pp. 163–177.

"A Static Type System for Message Passing", G. Ghelli, *OOPSLA,* 1991, pp. 129–143.

"Supporting distributed objects in FIFO–based message–passing systems", W. Chang et al., *JOOP,* Feb. 1995, pp. 56–64.

"The Xthreads Library: Design, Implementation, and Applications", J. Sang et al., *IEEE COMPSAC,* 1993, pp. 173–179.

5,925,108

EVENT NOTIFICATION IN A COMPUTER SYSTEM

RELATED APPLICATIONS

This application is based on commonly owned copending U.S. patent application Ser. No. 60/007,214, filed Nov. 3, 1995, for a Method and Apparatus for Improved Event or Message Notification in a Computer System (hereinafter "the '214 application").

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

The present invention relates to the management of event or message notifications in a computer system, and more particularly to the relationship between event handler registration, the manner in which registered event handlers receive notification of events, and the computer system architecture.

TECHNICAL BACKGROUND OF THE INVENTION

Event mechanisms are used in many different computer systems to enable parts of the system to communicate with one another. The terms "event" and "message" are used inconsistently within the literature. As used herein, "event" refers to an incident whose occurrence (and possibly associated data) should be communicated by one part of a computer system to at least one other part of the system to enable the system to operate appropriately. "Event" is sometimes used as an abbreviation for "message describing an event," because communication may be accomplished by transmitting messages between different parts of the system using computer hardware. The hardware is often (but not necessarily) controlled by computer software. The messages transmitted in response to an occurrence of an event are sometimes termed "event notifications."

One familiar approach to the management of event notification utilizes a procedural implementation. The notifying function is made expressly aware of the destination(s) of each event notification. The notifying function makes a specific call to a function in each destination which is responsible for handling the information resulting from the communication. This type of message communication is "tightly coupled" in the sense that the notifying function and the destination function must know of each other at compile time in order for the function calls to be correctly linked together.

In such procedural implementations, the notifying function is forced to make multiple calls (either directly or indirectly) whenever more than one destination needs to receive the message, because one call must be made for each destination. If the messages are intended to arrive at their respective destinations in a particular order, then the notifying function imposes an ordering by calling the destination functions in the desired sequence. This likewise requires express knowledge of the destination functions.

Under another approach to the management of event notification, the messages (or events) are passed through a message queue from the source to the destination. This creates a "loosely-coupled" system in that the sending and receiving functions need not know about each other at compile time, but are linked instead through the message queue. Such a message queue implementation is difficult to use when a message may have multiple destinations because the message queue is typically implemented as a first-in first-out ("FIFO") structure. After the first destination has retrieved the pending message from the queue, the message is either removed, in which case it is no longer available for any other destination, or the message is left in place, in which case it hinders access to subsequent messages.

Under a third approach, event sources and event destinations are loosely coupled through a registration process. This allows several destinations for a single source, but the order in which messages are distributed to multiple destinations is either tightly constrained or unpredictable. Two types of distribution are used, namely "simultaneous" broadcast and distribution according to the order of destination registration.

Under "simultaneous" broadcast, the order of receipt is not important, so it is assumed that all destinations receive the message at the same time. In practice, messages may arrive at different times but the order is not predictable and thus cannot be relied on.

Distribution according to the order of destination registration may result in a First Registered First Notified order or a Last Registered First Notified order. In either case, the order in which different destinations receive a given message depends on the order in which the destinations registered their interest in such messages with some central registry. In situations where the desired order of message receipt does not match the most convenient or established order of registration, tying the event notification order so closely to the registration order is not advantageous.

Yet another approach to event notification utilizes hardware based priority encoders. These encoders, which are tailored for use in prioritizing multiple simultaneous inputs, take a number of inputs of varying degrees of priority. When several inputs are asserted, the encoder resolves to the input which has the highest priority. When that input has been satisfied and is no longer asserted, the priority encoder will again resolve to the input which has the highest priority. This mechanism allows the asserted input with the highest priority to always be identified when multiple inputs are asserted at one time.

However, such special-purpose hardware is expensive, difficult to configure, and difficult to upgrade. Moreover, each piece of hardware is customized, so the hardware introduces many potential failure points which cannot be fixed without hardware changes. Finally, priority encoders are tailored for use in prioritizing simultaneous inputs, not for ordering a sequence of event notifications.

Thus, it would be an advancement in the art to provide a system and method for loosely coupled event notification to multiple destinations which allow the notification order to differ from the registration order.

It would also be an advancement to provide such a system and method which do not require special-purpose hardware such as priority encoders.

It would be an additional advancement to provide such a system and method which support broadcast notification.

Such a method and system for event notification are disclosed and claimed herein.

BRIEF SUMMARY OF THE INVENTION

The present invention provides a novel method and system which allow an event notification to be sent to multiple destinations according to a predefined order. In one embodiment, the notification order is established when each destination registers for notification of the event. However, the notification order need not be the same as, or even the reverse of, the registration order.

Each registration of a destination for event notification includes an indication of the desired notification order of the event handler (also termed herein the event "consumer", although consumption of an event to prevent further notifications is optional). This notification order does not change after the registration. This distinguishes the invention from executive task handlers which constantly reassign priority to each task to determine which task will execute next. The event engine, upon receipt of the event notification, first passes notification to the registered destination with the highest notification level, followed by the next and so on. An option exists for the engine to start with the event destination of the lowest notification level and continue until the highest level event destination has been serviced. If a broadcast mode of notification is desired, or if ordering is not important, then registering the event destination with any notification level will produce the desired results for broadcast events.

The invention has several features which promote modular, logically organized source code without sacrificing the ability to fully control the order of event notification. The invention allows a loosely coupled system in which event handlers do not need to be expressly known by the function producing the event. The event handlers do not need to know that any other routine is also interested in handling the notification of the event. Other events will be notified according to the order specified at notification registration time. This means that the registration can occur in any arbitrary order for a given set of interested destinations and the proper order of notification will still be enforced.

In some embodiments, the desired ordering corresponds directly to a well known scale, such as a memory hierarchy or the ordered layers in a network architecture reference model. One such embodiment is utilized in the Novell VLM Client code. Another embodiment is utilized in the Novell Client32 code, which contains modules that approximate the seven levels of the well-known Open Systems Interconnection network architecture reference model ("OSI Model") (CLIENT32 is a trademark of Novell, Inc.).

This ordering, evident in the design of Client32 code, is also the order required for most of the events of interest within the client. For example, if a user wishes to remove a PCMCIA Network Interface Card ("NIC") from a client the following sequence of events needs to be accomplished:

(a) all open files associated with the connection supported by the NIC need to be closed;

(b) any file information cached at the client for those connections needs to be flushed to the server disks;

(c) the connection needs to be closed or terminated;

(d) the transport (IPX) needs to be notified that the NIC in question is no longer available for service requests; and (e) the low-level drivers associated with the card need to be notified that the particular NIC is no longer available in the machine.

Without the present invention, these notifications could be accomplished in a tightly coupled system, but a notification routine would require intimate knowledge of the above sequence of events and would call routines associated with each of the above mentioned notifications. Such dependencies interfere with modular, logically organized code and hence make the creation and modification of large computer systems more difficult and expensive.

However, with the present invention this ordering can be readily achieved without such dependencies. An event is associated with the "Remove PCMCIA Card" action, and corresponding event handlers are provided for the file system, the file cache, the connection manager, the transport module, and the low-level NIC driver. Upon registration a notification order is specified for these event handlers. The notification order, which may differ from the registration order, is based upon the OSI Model. Upon receipt of the event occurrence, a system according to the invention notifies each of the destinations in turn according to their notification order.

Other events in Client32 code require a different ordering. Some of the events of interest are handled in a bottom-up OSI Model ordering rather than the top-down ordering illustrated above. But bottom-up notification order can also be readily specified for a given class of events using the present invention.

The invention allows event handler code to be located in the source modules affiliated with the respective tasks to be accomplished. The registration of the event handler can also be located in the same piece of code. This promotes data hiding and a more object-oriented approach to programming than the tightly-coupled procedural approach, and readily allows multiple destinations, unlike the message queue approach.

The features and advantages of the present invention will become more fully apparent through the following description.

BRIEF DESCRIPTION OF THE DRAWINGS

To illustrate the manner in which the advantages and features of the invention are obtained, a more particular description of the invention summarized above will be given with reference to the attached drawings. These drawings only provide selected embodiments of the invention and are not therefore to be considered limiting of its scope. In the drawings.

DETAILED DESCRIPTION OF THE PREFERRED EMBODIMENTS

The present invention relates to a method and apparatus for managing event notification in a computer system. The invention is suitable for use on individual stand-alone computers as well as on individual or multiple computers connected in a computer network. The computers may be workstations, laptop computers, disconnectable mobile computers, file servers, or a combination thereof. The network may include one or more LANs, wide-area networks, Internet servers and clients, intranet servers and clients, or a combination thereof.

Figure 1:
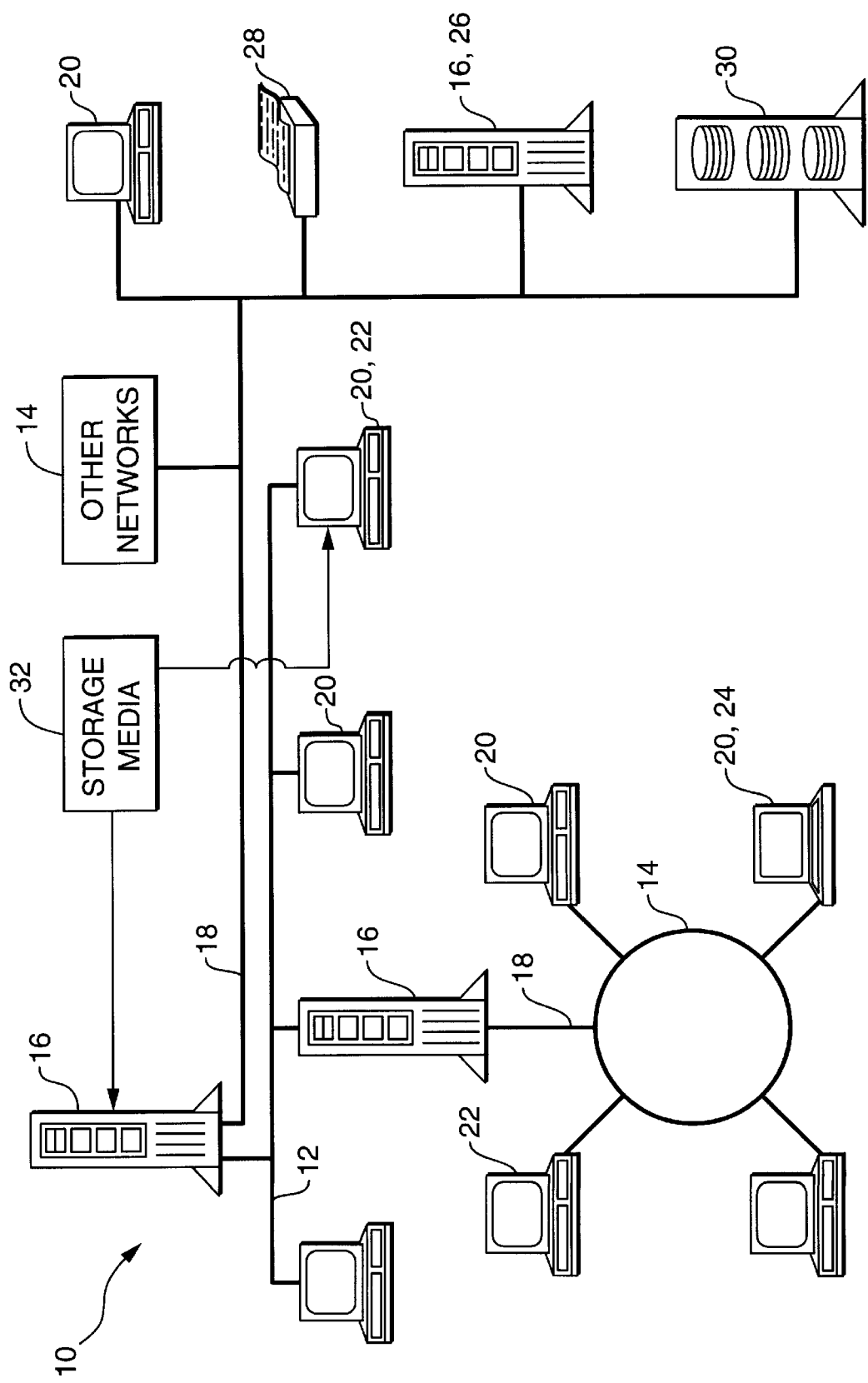
FIG. 1 is a diagram illustrating individual computers and a computer network, each of which is suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.). In alternative embodiments, the network includes NetWare Connect Services, VINES, Windows NT, Windows 95, LAN Manager, or LANtastic network operating system software (VINES is a trademark of Banyan Systems; WINDOWS NT, WINDOWS 95, and LAN MANAGER are trademarks of Microsoft Corporation; LANTASTIC is a trademark of Artisoft). The network 10 may include a local area network 12 which is connectable to other networks 14, including other LANs or portions of the Internet or an intranet, through a gateway or other mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory services providers, as software component servers, or as a combination thereof. The servers 16 may be uniprocessor or multiprocessor machines.

Suitable network clients 20 include, without limitation, personal computers 22, laptops 24, and workstations 26. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform event notification steps of the present invention substantially as described herein.

Figure 2:
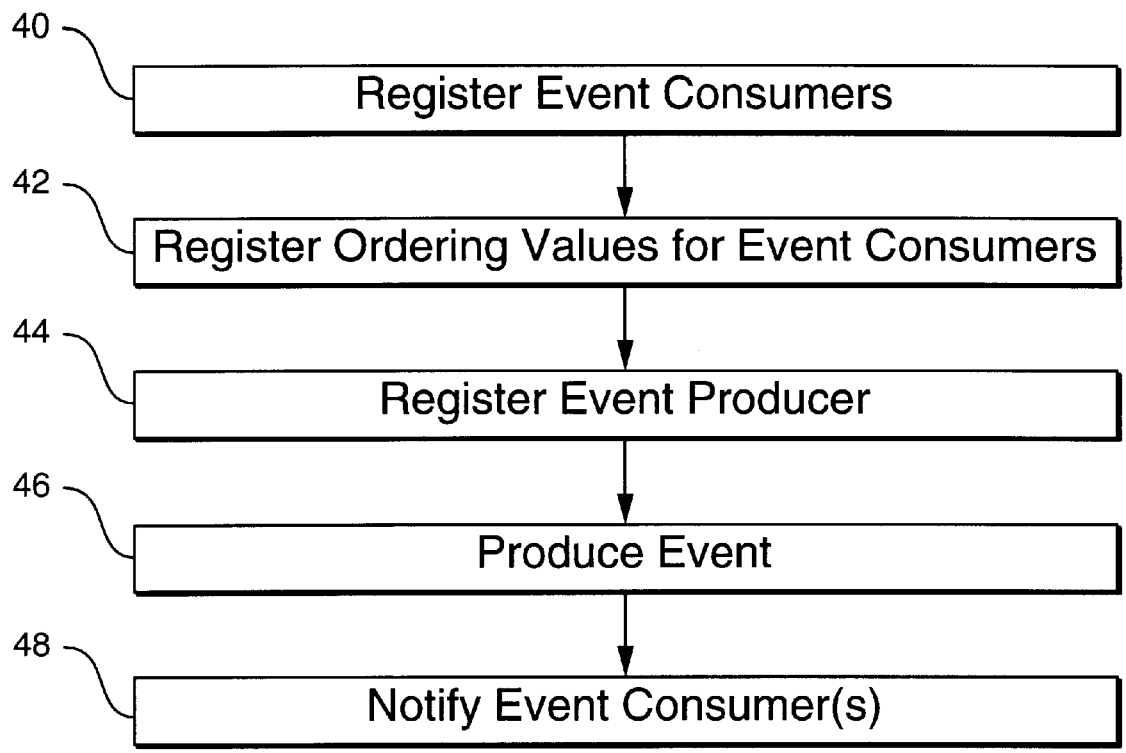
FIG. 2 is a flowchart illustrating a notification method of the present invention, including a notifying step.

FIG. 2 illustrates a method for managing event notification in a computer system (such as one or more of the systems 10, 16, 20 shown in FIG. 1) according to the present invention. The method includes a step 40 of registering at least one event consumer with a registry capable of holding multiple registrations. Registration is described in greater detail hereafter, but generally creates a record of which event consumers to notify in response to which events.

Suitable event consumers include event handlers of the kind familiar to those of skill in the art. One suitable registry includes a linked list of Event Control Blocks ("ECBs") such as the list of NESL_ECB structures described in English and in the C programming language in the '214 application; said description is hereby incorporated by reference. In addition to providing the registry with information such as an identification of the event handler and the event(s) of which it wishes notification, the event handler registration step 40 defines a registration order for the registered event consumers.

The method also includes a step 42 of registering an ordering value for at least one registered event consumer. The step 42 defines an event consumer order which typically differs from the registration order. In some embodiments, the steps 40 and 42 are both accomplished using one routine, such as the NESLRegisterConsumer( ) function described in English and in the C programming language in the '214 application; said description is hereby incorporated by reference.

The method also includes a step 44 of registering at least one event producer with the registry. Such registration produces a record containing at least an identifier for the producer and the type of event it produces. In one embodiment, the step 44 is accomplished using a NESLRegisterProducer( ) function described in English and in the C programming language in the '214 application; said description is hereby incorporated by reference. Multiple registered producers may produce the same event.

The method also includes a step 46 of producing an event using the event producer that was registered during the step 44. Suitable events include a wide variety of events relating to user actions, resource usage, and other occurrences both within and without the computer system, of types familiar to those of skill in the art. In one embodiment, the step 46 is accomplished using a NESLProduceEvent( ) function and an EventData structure described in English and in the C programming language in the '214 application; said description is hereby incorporated by reference.

Finally, the illustrated method includes a step 48 of notifying at least one of the event consumers of the event. Notification is performed "according to" the event consumer order, namely, in the specified order or in the reverse of that order. Although the event consumer order may coincide with the registration order, it need not do so. In one embodiment, the step 48 is accomplished using callback routines which were registered during the step 40. The callback routines are invoked according to the order defined during the step 42. Notification is further described in English and in the C programming language in the '214 application; said description is hereby incorporated by reference.

Figure 3:
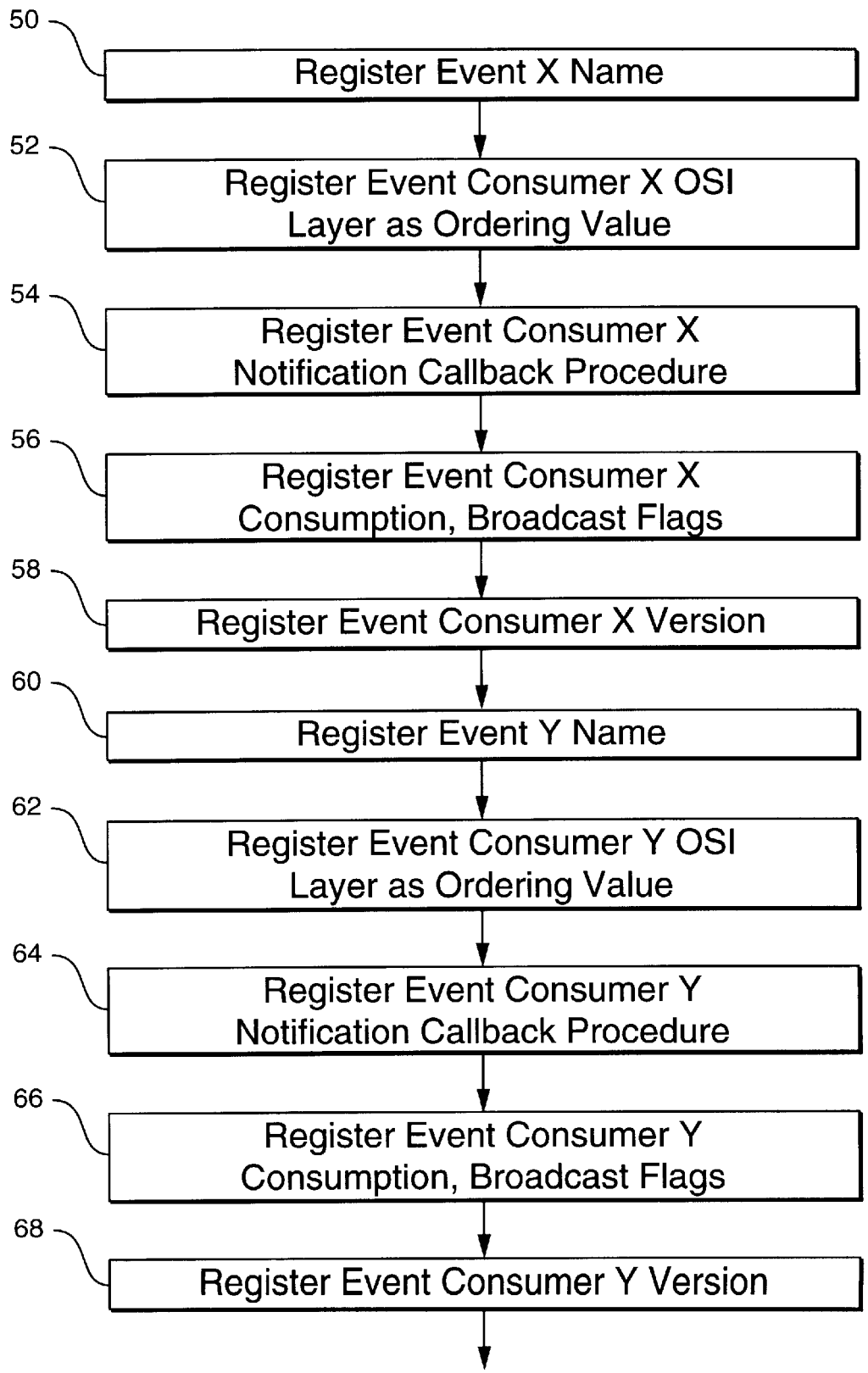
FIG. 3 is a flowchart further illustrating registration steps of the method shown in FIG. 2.

FIG. 3 illustrates one embodiment of the steps 40, 42 in greater detail. The step 40 of registering event consumers comprises steps 50, 60 of registering the names of two events X and Y; steps 54, 64 of registering callback procedures for X and Y; steps 56, 66 of registering certain flags or equivalent indicators; and steps 58, 68 of registering version identifiers. The step 42 of registering ordering values comprises steps 52, 62 of registering OSI Model layers as ordering values. As indicated at the bottom of FIG. 3, registrations may also be performed for additional event handlers; two registrations are shown merely for illustration.

One embodiment of a system according to the invention maintains in computer memory a dynamically allocated linked collection of ECBs corresponding to events. Each ECB contains a version indicator, at least one ordering value, an event name, an indication as to whether the corresponding event is consumable, an indication as to whether the corresponding event is for broadcast, an identification of a module which owns the event, and a pointer to an internal workspace. In one embodiment, broadcast events are implemented as non-consumable events.

ECBs and each of the steps shown in FIG. 3 are further described in English and in the C programming language in the '214 application; said descriptions are hereby incorporated by reference. By way of illustration, and not limitation, steps 50, 60 may be accomplished using the NESL_ECB NecbEventName field and related routines; steps 52, 62 may be accomplished using the NESL_ECB NecbOsiLayer field and related routines; steps 54, 64 may be accomplished using the NESL_ECB PNecbNotifyProc field and related routines; steps 56, 66 may be accomplished using the NESL_ECB NecbRefData field and related routines; and steps 58, 68 may be accomplished using the NESL_ECB NecbVersion field and related routines.

Steps 52 and 62 illustrate a method wherein the step 42 (FIG. 2) of registering an ordering value for each event consumer comprises registering ordering values which correspond directly to layers in a computer network architecture reference model, namely, the OSI Model. As discussed in the Summary of the Invention, at pages 77–78, 134 in the '214 application, and elsewhere, allowing notification in an order that corresponds to system architecture but nonetheless differs from registration order allows software to be organized more logically and efficiently from a programmer's point of view.

Under an alternative method of the invention the step 42 (FIG. 2) of registering an ordering value for each event consumer comprises registering ordering values which correspond directly to a memory hierarchy. Various memory hierarchies are well-known, including hierarchies organized according to memory access speed, memory capacity, the number of tasks which rely on data stored in a particular section of memory, and other familiar criteria. Event consumers may be organized during the step 42 according to the levels of such a memory hierarchy.

To illustrate this aspect of the invention, assume that a given memory hierarchy contains a file contents cache, a network connection cache, and a volume information cache, in order of increasing importance. Assume further that an "out of memory" event occurs which is intended to cause some cache event handler to free up a block of memory containing at least a requested number of bytes, such as 8 Kbytes. The first event handler to see the event is the file contents cache event handler; if that handler can free 8 Kbytes, it does so and then consumes the event. If the file contents cache event handler cannot free 8 Kbytes, it returns a "not consumed" message to the event engine, which then passes the "out of memory" event notification to the network connection cache event handler. This handler either frees the requested memory and consumes the event or returns a "not consumed" status to the event engine, which passes the event notification on to the volume information cache event handler.

Of course, the event handlers could also be configured to free whatever memory they can, even if it is less than the requested amount, and then pass the event notification on with data which represents a running total of the memory freed in response to the event. In either case, this example illustrates both the flexibility provided by separating event consumer order from registration order and the usefulness of consumable events.

Figure 4:
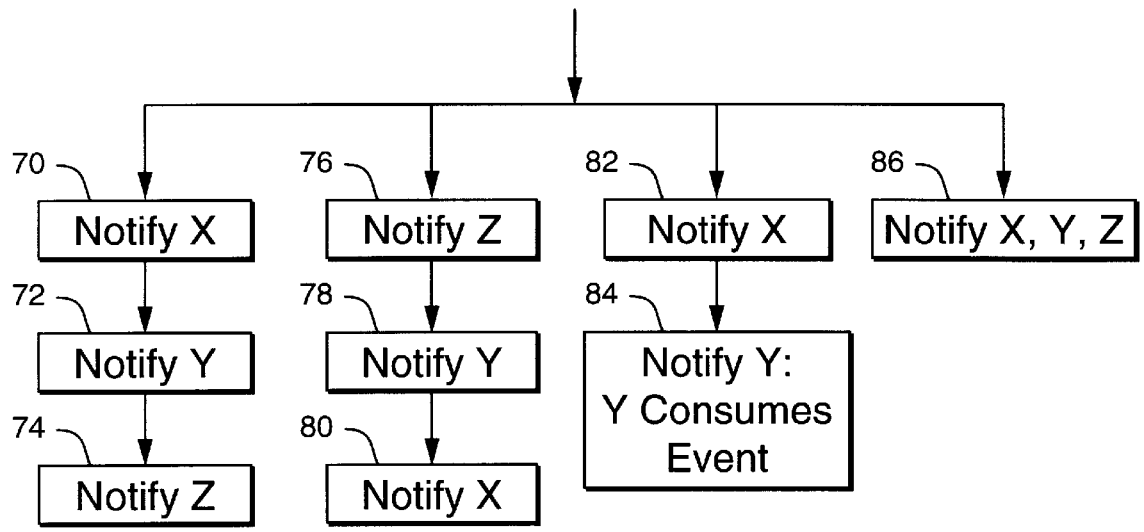
FIG. 4 is a flowchart further illustrating the notifying step shown in FIG. 2.

FIG. 4 illustrates alternative methods provided by the present invention for performing the notifying step 48 (FIG. 2). A first sequence, comprising steps 70–74, notifies three event handlers in the order indicated, namely X followed by Y followed by Z. Three notifications are shown for illustration; more or fewer notifications are performed similarly according to the invention. The X-Y-Z sequence shown in steps 70–74 is followed under various circumstances. It may be that X has a higher ordering value than Y, which in turn has a higher ordering value than Z. Alternatively, it may be that X and Y (or Y and Z, or all three) have the same primary ordering value but different secondary ordering values were registered. Or it may be that X and Y (or Y and Z, or all three) have the same ordering value but X was registered before Y, which was registered before Z.

Differently stated, according to one method the notifying step 48 (FIG. 2) notifies event consumers according to the registration order when the event consumers have the same ordering value and otherwise notifies event consumers according to the event consumer order.

Figure 5:
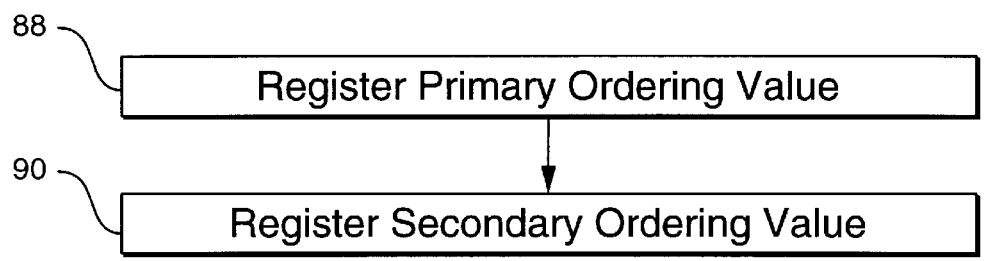
FIG. 5 is a flowchart further illustrating an ordering value registration step shown in FIG. 2.

According to another method, the step 42 (FIG. 2) includes steps 88 and 90 shown in FIG. 5, resulting in registration of both primary and secondary ordering values. The step 90 of registering secondary ordering values defines a secondary event consumer order which differs from the registration order. The notifying step 48 then notifies event consumers according to the secondary event consumer order when the event consumers have the same primary ordering value and otherwise notifies event consumers according to the primary event consumer order defined by the step 88. This method can be used to define the relative order for event notifications within each OSI Model layer while preserving the overall layer-by-layer notification order.

A second sequence shown in FIG. 4, comprising steps 76–80, illustrates the meaning of notification "according to" a specified order through contrast with steps 70–74. The notification order may be identical with the specified order, or the notification order may be the reverse of the specified order. This allows, for instance, both top-down and bottom-up OSI Model ordering. Note that it is not necessary to re-register event handlers to reverse the effective notification order. Events may be registered or flagged as "top-down" or "bottom-up." The producer declares an event to be top-down or bottom-up, and the consumers merely register their OSI or other notification level.

A third sequence shown in FIG. 4, comprising steps 82–84, illustrates consumption of an event by an event handler. During step 82, event handler X is notified of a given event. During subsequent step 84, event handler Y is notified of the event. The event handler Y determines that no further notifications are needed, and "consumes" the event, thereby preventing the notification of event handler Z that would otherwise occur. Event consumption is optional; reference to an event handler as an "event consumer" herein does not dictate that the event handler always consume event notifications. Rather, event consumption is controlled by mechanisms such as the NESL_ECB NecbRefData and PNecbNotifyProc fields described in the '214 application or their equivalents.

The fourth sequence shown in FIG. 4, comprising step 86, illustrates a broadcast notification in which order is irrelevant. In such cases, the notifying step 48 (FIG. 2) broadcasts an event notification to all event consumers which have registered as consumers of events of an event class to which the event produced by an event producer belongs. In one embodiment, broadcast notification utilizes the NESL_ECB NecbRefData and PNecbNotifyProc fields described in the '214 application.

Figure 6:
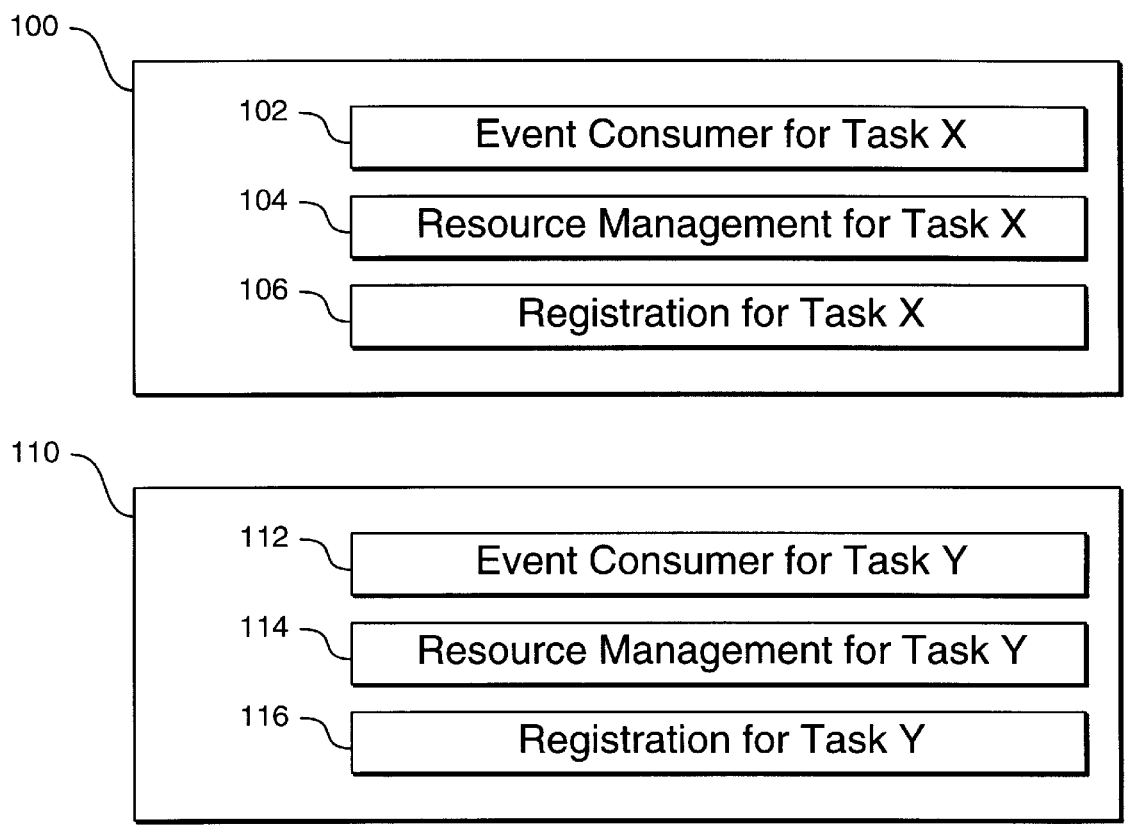
FIG. 6 is a block diagram illustrating a form of software organization supported by the present invention.
Figure 7:
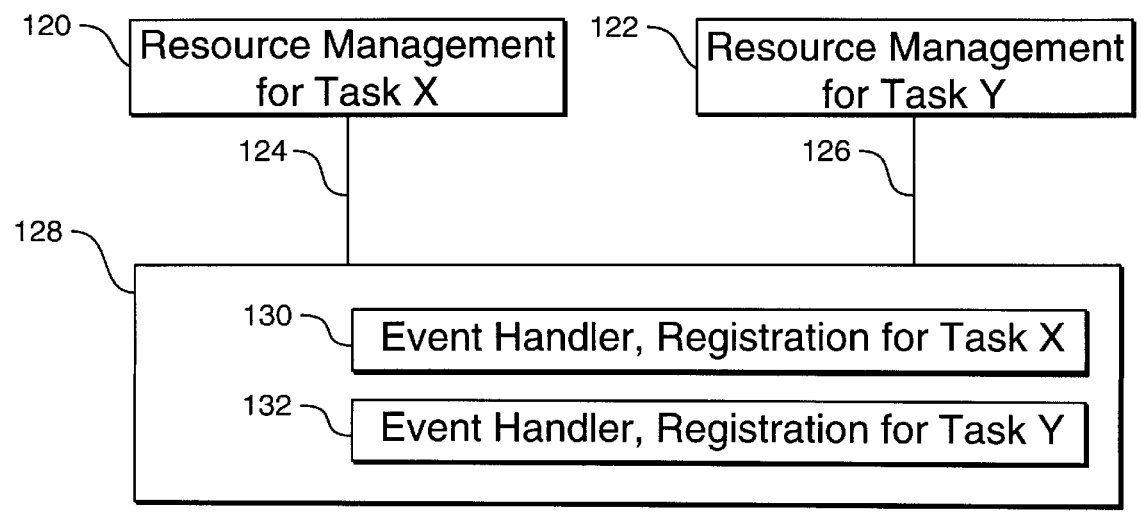
FIG. 7 is a block diagram illustrating a form of software organization utilized in the absence of the present invention.

FIGS. 6 and 7 illustrate the manner in which the present invention promotes logical software organization. FIG. 6 shows code modules 100, 110 for two tasks X and Y. The event consumers 102, 112, resource managers 104, 114, and registration routines 106, 116 for each task reside within the module for that task. This promotes modularity, aids understanding, and reduces the risk of errors when changes are made. Typical resource management steps include management of file system, network, or computer memory resources.

By contrast, the event handlers/registration routines 130, 132 for tasks X and Y are placed in a separate module 128 in FIG. 7, which assumes the present invention is not available. The resource managers 120, 122 for the tasks are separated from the event handlers/registration routines 130, 132 to allow registration in the desired notification order. This creates undesirable dependencies 124, 126 between separate modules.

Thus, as illustrated in FIG. 6, the present invention allows computer program instructions for implementing an event consumer to be located in the same source code module as computer program instructions for implementing resource management steps in response to the event. In addition, the source code module may contain computer program instructions for implementing at least in part the step 40 (FIG. 2) of registering the event consumer with the registry.

In summary, the present invention provides a novel approach which separates registration order from notification order for multiple destinations, supports broadcast events, supports consumable events, and promotes well-organized software. Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only.

We claim:

1. A method for managing event notification in a computer system, comprising the steps of:
   registering at least one event consumer with a registry, the registry being capable of holding a plurality of event consumer registrations, said step of registering event consumers also defining a registration order for the registered event consumers;
   registering an ordering value for each registered event consumer with the registry, said step of registering ordering values also defining an event consumer order which differs from the registration order;
   registering at least one event producer with the registry;
   producing an event using the event producer; and
   notifying at least one of the event consumers of the event, said notifying being performed according to the event consumer order.

2. The method of claim 1, wherein said step of registering an ordering value for each event consumer comprises registering ordering values which correspond directly to layers in a computer network architecture reference model.

3. The method of claim 2, wherein the ordering values correspond directly to layers in the Open Systems Interconnection computer network architecture reference model.

4. The method of claim 1, wherein said notifying step comprises broadcasting an event notification to all event consumers which have registered as consumers of events of an event class to which the event produced by the event producer belongs.

5. The method of claim 1, wherein said notifying step comprises notifying at least two event consumers which have registered as consumers of events of an event class to which the event produced by the event producer belongs.

6. The method of claim 1, wherein said notifying step comprises notifying one event consumer which then consumes the event, thereby preventing another event consumer from being notified of the event even though both of the event consumers are registered as consumers of events of an event class to which the event belongs.

7. The method of claim 1, wherein said step of registering an ordering value for each event consumer comprises registering the same ordering value for two event consumers.

8. The method of claim 7, wherein the step of registering an ordering value comprises registering a primary ordering value and a secondary ordering value for each event consumer with the registry, the secondary ordering values define a secondary event consumer order which differs from the registration order, and wherein said notifying step notifies event consumers according to the secondary event consumer order when the event consumers have the same primary ordering value and otherwise notifies event consumers according to the event consumer order defined by the primary ordering values.

9. The method of claim 7, wherein the step of registering an ordering value comprises registering a primary ordering value and a secondary ordering value for each event consumer with the registry, the secondary ordering values define a secondary event consumer order which differs from the registration order, and wherein said notifying step notifies event consumers according to the registration order when the event consumers have the same primary ordering value and also have the same secondary ordering value and otherwise notifies event consumers according to the primary event consumer order and then according to the secondary event consumer order.

10. The method of claim 1, wherein said notifying step comprises notifying a plurality of event consumers according to the event consumer order by notifying every event consumer which is registered as a consumer of events of an event class to which the event belongs and which has a given ordering value before notifying any event consumer which is registered as a consumer of events of an event class to which the event belongs and which has an ordering value higher than the given ordering value.

11. The method of claim 1, wherein said notifying step comprises notifying a plurality of event consumers according to the event consumer order by notifying every event consumer which is registered as a consumer of events of an event class to which the event belongs and which has a given ordering value before notifying any event consumer which is registered as a consumer of events of an event class to which the event belongs and which has an ordering value lower than the given ordering value.

12. The method of claim 1, wherein computer program instructions for implementing an event consumer are located in the same source code module as computer program instructions for implementing resource management steps in response to the event, said resource management steps comprising management of file system, network, or computer memory resources.

13. The method of claim 12, wherein the source code module further comprises computer program instructions for implementing at least in part said step of registering the event consumer with the registry.

14. The method of claim 1, further comprising the step of maintaining in computer memory a dynamically allocated linked collection of event control block structures corresponding to events, each event control block structure containing a version indicator, an ordering value, an event name, an indication as to whether the corresponding event is consumable, an indication as to whether the corresponding event is for broadcast, an identification of a module which owns the event, and a pointer to an internal workspace.

15. A computer-readable storage medium having a configuration that represents data and instructions which cause a computer system to perform method steps for managing event notification, the method steps comprising the following:

registering at least one event consumer with a registry, the registry being capable of holding a plurality of event consumer registrations, said step of registering event consumers also defining a registration order for the registered event consumers;

registering an ordering value for each registered event consumer with the registry, said step of registering ordering values also defining an event consumer order which differs from the registration order;

registering at least one event producer with the registry;

producing an event using the event producer; and notifying at least one of the event consumers of the event, said notifying being performed according to the event consumer order.

16. A computer system for managing event notification, the system comprising:

at least one computer having a registry;

a plurality of event consumers;

means for registering each event consumer with the registry, thereby defining a registration order for the registered event consumers;

means for registering an ordering value for each registered event consumer with the registry, thereby defining an event consumer order which differs from the registration order;

means for registering at least one event producer with the registry;

means for producing an event using the event producer; and means for notifying at least one of the event consumers of the event, with notification being performed according to the event consumer order.

17. The system of claim 16, further comprising at least one additional computer, the two computers being connected in a computer network.

18. The system of claim 16, wherein said means for producing an event comprises means for producing a consumable event.

19. The system of claim 16, wherein the system further comprises a memory hierarchy and the event consumer order corresponds to said memory hierarchy.

20. The system of claim 16, wherein the system further comprises a computer network and the event consumer order corresponds to levels in an architecture of said computer network.

* * * * *